Patented Jan. 30, 1945

2,368,426

UNITED STATES PATENT OFFICE 2,368,426

FURFURYL ALCOHOL RESIN AND PROCESS OF MAKING

Frank B. Root and Carl W. Virgin, Montclair, N. J., assignors to Ellis-Foster Company, a corporation of New Jersey No Drawing. Application September 28, 1943, Serial No. 504,148

5 Claims. (Cl. 260—92.6)

This invention relates to a thermosetting resin which is suitable for molding and coating compositions and other uses. It comprises reacting furfuryl alcohol with ammonium thiocyanate in manners to be described, whereby a new and useful composition is formed.

It is an object of this invention to provide a binder suitable for the production of an improved cold-molding composition. A further object is to provide an improved baking lacquer having a very high hiding power and durability. Another object is to provide a thermosetting plasticizer of superior qualities for natural and synthetic rubber.

There are many thermosetting compositions known to the art which utilize furfuryl alcohol but their use is limited because of their instability upon storage, particularly if they are prepared ready for use as with a catalyst. We have found that a solution of ammonium thiocyanate in furfuryl alcohol and also intermediate reaction products of furfuryl alcohol and ammonium thiocyanate, when prepared with or without curing catalysts, are stable when stored under ordinary conditions and such solutions or products are ready for use without further additions of catalysts or other preparatory operations.

We have also found that upon heating such solutions of ammonium thiocyanate in furfuryl alcohol or their intermediate products, with or without catalysts, insoluble films and moldings are formed. Ammonium thiocyanate is soluble in furfuryl alcohol to the extent of about 13% at room temperature and such solutions upon heating form insoluble films of high hiding power. Upon heating for short periods of time at high temperatures or for longer periods of time at lower temperatures, the viscosity of the lacquer or molding composition binders can be controlled to any desired degree and also that larger amounts of ammonium thiocyanate can be utilized. We have found that such intermediate compounds are stable upon storage, with or without curing catalysts, and are ready for use without any further additions or operations. The percentage of ammonium thiocyanate may advantageously be varied from between 5 and 35% based on the total weight of solution or mixture but we do not wish to be held to these limits.

There are several methods of preparing these solutions or compounds, the choice of which depends upon the use or condition to which they are to be put. If a very low viscosity baking lacquer is desired it is necessary merely to put the ammonium thiocyanate into solution in the furfuryl alcohol, preferably with agitation, coat the article to be lacquered with the solution and bake the coated article at an elevated temperature, say 150° C.

One method of producing high viscosity products comprises heating with agitation the solution or mixture of ammonium thiocyanate in furfuryl alcohol to about 140–150° C. whereby an exothermic reaction takes place and arresting the exothermic reaction by cooling when the desired viscosity is reached.

Another method of producing high viscosity products comprises heating with agitation the solution or mixture of ammonium thiocyanate in furfuryl alcohol at about 120° C. (or below the temperature where an exothermic reaction begins) until the desired viscosity is reached.

Still another method of producing high viscosity products comprises heating with agitation and a reflux condenser the solution or mixture of ammonium thiocyanate in furfuryl alcohol to the point where an exothermic reaction begins and allowing the low boiling by-products of the reaction to reflux back into the reaction chamber where they arrest the exothermic reaction. The viscosity of the product is controlled by the amount of reflux allowed and the time and temperature of subsequent heating after the exothermic reaction is arrested.

Still another method of producing high viscosity products under controllable conditions comprises heating with agitation and a reflux condenser the solution or mixture of ammonium thiocyanate in furfuryl alcohol along with a mutual organic solvent such as, say, n-butyl acetate. The choice and amount of such organic solvent, the amount of reflux allowed, and the time and temperature of heating are factors leading to the control of the viscosity of the final product as well as its other physical properties.

We have found that the properties of the films and molding compositions produced by the reaction of ammonium thiocyanate and furfuryl alcohol can be modified to suit our purpose by the inclusion of such compatible plasticizers and compounds as diphenyl xenyl phosphate, hexamethylene tetramine, dibutyl phthalate, diethyl sebacate, tri-o-cresyl phosphate, triphenyl phosphate, oleic acid, tall oil, methyl abietate, furfuryl acetate, ester gum, rosin, gasoline-insoluble resinous pinewood extracts such as that sold under the name of Vinsol, and cashew liquid. For certain purposes we have found it advantageous to employ such solvents as ketones, furfural, furfuryl alcohol, glycol ethyl ether, butyl acetate, diethylene glycol ethyl ether, nitropropane, and ethyl lactate. Other modifications of manufacture and properties will be evident to those skilled in the art.

We have found that we can shorten the baking or curing time of the products of reacting furfuryl alcohol and ammonium thiocyanate by the use of various catalysts. Such catalysts as mercaptobenzothiazole (a rubber accelerator), p-toluenesulfonic acid, cobalt naphthenate, and t-butyl hydroperoxide are soluble in the reaction product and act as curing reactants. A mixture of cobalt naphthenate and p-toluenesulfonic acid gives very fast cures. Solutions of these catalysts in the furfuryl alcohol-ammonium thiocyanate reaction product are stable upon storage under ordinary conditions. Sulfamic acid, although not soluble in the reaction product, promotes its cure and forms stable mixtures. Mineral acids can also be used as curing catalysts. Preferably the acid is first made up as a dilute solution in an organic solvent (as, for instance, 5% HCl in n-butylacetate) and then made into, say, a 60% solution of the reaction product in that acid-solvent. Such an acidified solution of the reaction product has proven to be stable under ordinary conditions and gives fast-baking lacquers.

It is of interest to note that when this last mentioned acidified solvent solution was allowed to dry as a film at room temperature for 4-5 days a wrinkle finish developed which upon baking at 150° C. resulted in a hard product. However, when such a solution was baked shortly after laying down as a film, and not allowing to air-dry, a highly glossy film resulted.

The reaction product of furfuryl alcohol and ammonium thiocyanate is useful in cold molding compositions wherein only a small percentage of binder is necessary to assure excellent flow of material during the molding stage and gives a finished product of high strength and glossy surface. When a medium viscosity binder is used it is not necessary to use any solvent to disperse the binder on the filler or to get good flows. We found that under such conditions it is not necessary to preheat the moldings slowly before they are cured or to raise the temperature of the curing oven slowly as is now practised in the art. Our cold moldings have the advantage that they can be put directly into the curing oven at, say, 150° C. without blistering or striating.

High hiding power baking lacquers can be made with the reaction product of furfuryl alcohol and ammonium thiocyanate. Since we can control the viscosity of the product at will, we can vary the amount of solvent within very wide limits. Incorporation of a catalyst to shorten the baking time is advantageous when rapid cure is desired.

These reaction products are compatible with natural and synthetic rubber and act as plasticizers for them. In the production of high durometer rubber stocks special plasticizers are used which tend to give stiff mixers prior to vulcanization because too soft or too much plasticizer would give low durometer vulcanizates. However, when the reaction product of ammonium thiocyanate and furfuryl alcohol is used as a plasticizer its relatively low viscosity and high plasticizing effect lend themselves to soft, easily worked rubber compounds which when vulcanized give higher durometer readings than those plasticizers now used in the art. This is due to the fact that our plasticizer is stable under milling or mixing operations yet cures or hardens under rubber vulcanizing conditions and loses its plasticizing effect.

To illustrate the invention, the following examples are offered as typical reactions, procedures, and applications, but they should not be construed so as to limit the invention as to scope or intent.

*Example 1*

|  | Grams |
| --- | --- |
| NH₄SCN (commercial) | 250 |
| Furfuryl alcohol | 750 | were vigorously stirred together in a two liter beaker. The beaker and its contents were heated in an oil bath to 142° C. at which temperature an exothermic reaction started. The oil bath was taken away and the reaction allowed to proceed by itself. The reaction was allowed to proceed until spot tests cooled to room temperature showed no NH₄SCN crystallizing out of solution and until the desired viscosity of the material was reached. A medium viscosity was attained in about 12 minutes from the time the exothermic reaction began. At this point, the reaction was stopped by the use of a water bath. The product was a very dark brown mass of grainy appearance at room temperature, but it became homogeneous again upon gentle heating. A smear of the product on a glass plate was baked at 150° C. for 15 minutes to produce a very hard, black, high gloss finish which was not fusible. Long storage under ordinary conditions did not change or alter the reaction product. A 70% solution of the viscous reaction product in butyl acetate, when applied to glass and baked at 150° C. produced a jet black, hard, glossy, adherent film which was found to be highly resistant to boiling water, gasoline, toluene, denatured alcohol, 5% hydrochloric acid, 5 and and 50% caustic solutions, and saturated NaCl solution.

*Example 2*

|  | Grams |
| --- | --- |
| NH₄SCN (commercial) | 125 |
| Furfuryl alcohol | 375 | were vigorously stirred together in a one liter beaker. The beaker and contents were heated in an oil bath held at 120° C. In 1½ hours time spot tests showed no crystallization of the NH₄SCN at room temperature and showed that the viscosity was about the same as that in Example 1. A smear of the product on glass plate was baked in an oven at 150° C. and became hard and infusible in 28 minutes. The film had a very high glossy finish. Long storage under ordinary conditions did not change or alter the reaction product.

*Example 3*

|  | Grams |
| --- | --- |
| NH₄SCN (commercial) | 15 |
| Furfuryl alcohol | 85 |
| n-Butyl acetate | 15 | were vigorously stirred together in a 3-neck round bottom flask equipped with a reflux condenser. Heat was applied until refluxing began and this heat in-put was maintained for about ½ hour. Then the reflux condenser was taken off and the by-products of the reaction as well as the n-butyl acetate were distilled off. This product, at room temperature, was smooth and homogeneous. A film baked on a glass plate at 150° C. was hard and glossy in 33 minutes. Long storage under ordinary conditions did not change or alter the reaction product.

A baking lacquer was made by putting into solution 6 parts of this reaction product in 4 parts of n-butyl acetate. A film of this solution baked at 150° C. produced a very hard product of high gloss and exceptional hiding power. The film was a jet black color. No change in the solution was observed after long storage at ordinary conditions.

Example 4

| | Grams |
|---|---|
| NH₄SCN (commercial) | 150 |
| Furfuryl alcohol | 850 | were vigorously stirred together in a two liter beaker. The beaker and its contents were heated in an oil bath to 140° C. at which temperature an exothermic reaction started. The oil bath was taken away and the reaction allowed to proceed by itself until boiling ceased. The oil bath was then put back in place and heated at 145° C. for ½ hour. The viscosity of the product at room temperature was close to that of Example 1. A film of the product baked on a glass plate at 150° C. was hard, glossy and infusible in 25 minutes. Long storage under ordinary conditions did not change or alter the reaction product.

The application of reaction products such as the above as a rubber plasticizer was found to be advantageous when compared to conventional rubber plasticizers used in the art in high durometer stocks. This reaction product used as a plasticizer in milling natural and synthetic rubbers gave greater plasticizing effect on the mixing mill and retained its plasticizing effect during the aging period of the stock. Upon vulcanization of these stocks the products had higher durometer readings than other plasticizers now used in the art.

Example 5

A cold molding composition was made by thoroughly mixing together

| | Grams |
|---|---|
| The reaction product of Example 4 | 50 |
| Asbestos floats | 250 | in a cooled Banbury mixer with no pressure applied to the plug of the mixer. The binder wetted the filler very readily and the product was a dense mass of good cold molding consistency. Portions of this cold molding composition were molded in disc and cup dies using a film of oil on the dies as lubricant. The composition exhibited excellent flow and knitting properties and the formed articles were of excellent strength and surface smoothness. These articles were cured by placing them directly into an oven whose temperature was 110° C. and were completely cured in 7 hours. The baked articles had excellent strength and had highly glossy surfaces. They were a dark brown color. Storage for long periods of time under ordinary conditions did not change or set up the molding composition.

Example 6

Another cold molding composition was made by thoroughly mixing together

| | Grams |
|---|---|
| The reaction product of Example 1 | 180 |
| Asbestos floats | 1,020 | in a Baker-Perkins mixer. Portions of this cold molding composition were molded in disc and cup dies using a film of oil on the dies as lubricant. The composition exhibited excellent flow and knitting properties and the formed articles were of excellent strength and surface smoothness. These articles, some of them ¼ inch in cross section, were cured by placing them directly into an oven whose temperature was 150° C. and were completely cured in 1 hour. The baked articles had excellent strength and a semi-matte finish. They showed no signs of blisters or striations due to the sudden temperature change of the curing. They were black in color. Storage for long periods of time under ordinary conditions did not change or set up the molding composition.

We claim:

1. A composition comprising the resinous reaction product produced by heating furfuryl alcohol and ammonium thiocyanate.

2. A thermosetting resinous composition comprising a heat-convertible condensation product of furfuryl alcohol and ammonium thiocyanate.

3. A product comprising the heat-cured resinous composition of claim 2.

4. A heat-curable resinous composition comprising the heat-convertible resinous reaction product produced by heating a mixture containing furfuryl alcohol and ammonium thiocyanate, and a curing catalyst.

5. The process of preparing resinous compositions which comprises heating a reaction mixture containing furfuryl alcohol and ammonium thiocyanate.

FRANK B. ROOT.
CARL W. VIRGIN.